United States Patent Office 2,729,039
Patented Jan. 3, 1956

2,729,039

RESINOID BONDED CUTTING-OFF GRINDING WHEELS AND METHOD OF CUTTING METALS

Hyman Nathan Stone, Worcester, Mass., assignor to Norton Company, Worcester, Mass., a corporation of Massachusetts No Drawing. Application July 9, 1952,
Serial No. 297,981

6 Claims. (Cl. 51—206)

The invention relates to resinoid bonded grinding wheels and, with regard to its more specific features, to cutting-off wheels for cutting metals such as in the form of rods, shafts, bars, sheets and the like, and the invention also relates to a method of cutting metals. This application is a continuation-in-part of my copending application Serial No. 233,709 filed June 26, 1951 now abandoned.

One object of the invention is to provide a cutting-off wheel which will not stall. Another object of the invention is to provide a free-cutting cutting-off wheel. Another object of the invention is to provide a grinding wheel for grinding on the periphery which has a flat side or flat sides which have a relatively low coefficient of friction against various metals. Another object of the invention is to provide cutting-off wheels with side faces treated to reduce the power required to drive the wheels.

Other objects will be in part obvious or in part pointed out hereinafter.

Cutting-off wheels have for years been made of abrasive bonded with phenolic resin. Many patents have been issued describing procedures for the manufacture of phenolic resin bonded wheels. Many different fillers have been used in such wheels. Essentially the phenolic resin bond is a polymer consisting of phenolic, $C_6H_5OH$, groups linked together with methylene, $CH_2$, groups with or without additional or cross-linkages. It is well known that reactive phenolic resin usually contains some hexamethylenetetramine and for some of the phenolic, $C_6H_5OH$, groups cresylic groups, in which one of the hydrogen atoms on the benzene ring is replaced by methyl, can be substituted. Usually the cresylic groups are derived from metacresol. However the cresylic groups are always in minor proportions.

Various fillers can be used along with the abrasive, for example cryolite, iron pyrites and potassium fluoborate all of which have been reported in patents.

The abrasive for cutting-off wheels is usually fused alumina abrasive but can be silicon carbide abrasive and furthermore, for certain purposes, diamond abrasive will be used. Likewise other abrasive can be used in accordance with this invention.

Accordingly I provide a quantity of abrasive grain suitable for the manufacture of a cutting-off wheel and a quantity of phenolic resin to bond the abrasive, with or without fillers. In accordance with the present invention I make grinding wheels by bonding abrasive grain with phenolic resin and I treat the sides of the wheels in a manner to be fully described. As the art is fully familiar with the manufacture of phenolic resin bonded grinding wheels and the composition thereof including fillers, I shall give but a brief example of such manufacture and it will be understood that any desired phenolic resin bond and any desired filler can be used and that any abrasive can be selected.

In the manufacture of phenolic resin bonded wheels it has been efficacious first to wet the abrasive grain and for this purpose furfural is often employed but liquid reactive phenolic resin is also used to a large extent. In the illustrative example I wet the abrasive grain with liquid phenolic resin of the brand BR9332, then add a thorough mixture of iron pyrites (25%) and powdered reactive phenolic resin of the brand BR2417 (75%). The abrasive grain which was used to make up the wheels that were subjected to the tests as hereinafter described was fused alumina of 24 grit size.

I caused the manufacture of a number of wheels twelve inches in diameter by three-thirty seconds of an inch thick having one inch central holes out of phenolic resin-abrasive mix. These wheels were made in steel molds of conventional type consisting of a hollow cylindrical mold band, top and bottom plates of disc shape with central holes and a cylindrical mold arbor fitting therein. Naturally the inside diameter of the mold bands was twelve inches, the diameter of the arbors was one inch and the holes in the mold plates were one inch in diameter. The abrasive grains were first thoroughly wet with liquid resin leaving no substantial excess of liquid and then the mixture of powdered phenolic resin and iron pyrites was added while mixing. After pressing, the wheels were heat treated in conventional manner by slowly heating to 175° C. and then maintaining them at this temperature for about twenty-four hours. The wheels were pressed cold at a pressure of about 425 tons.

Some of these wheels had plain sides, that is to say nothing was done to the sides and as the mold plates were smooth the sides of the wheels were smooth. Other wheels had eight pound wood pulp paper secured to the sides thereof and still other wheels had the same paper coated with tin secured to the sides thereof. Of the tin coated paper some had .008 gram of tin per square centimeter thereon and other paper had .0125 gram of tin per square centimeter thereon. The paper, both that coated with tin and the uncoated paper, was applied to the wheel by placing a sheet cut to twelve inches in diameter with a one inch central hole in the mold on top of the bottom plate with the tin coating where there was a tin coating on the bottom and placing a similar sheet on top of the mix with the tin coating where there was a tin coating on top, then placing the top mold plate on top of the paper. All this, of course, was done before pressing and after pressing, the paper sheets, both those coated with tin and those not coated, were found to be secured to the uncured wheels and after curing by heating, as aforesaid, the paper was firmly bonded to the wheel surfaces.

For applying the tin to the paper a resinous suspension was made of 300 grams of powdered tin, 50 grams of powdered phenolic resin BR2417 and 500 cubic centimeters of isopropyl alcohol. This suspension was then spread onto the paper which was then dried under heat lamps. By spreading more or less, the required amount of tin per square centimeter can be incorporated onto the paper.

These wheels were tested on a Campbell No. 213 cut-off machine. This machine has a hydraulic down feed to force the wheel through the workpiece which is held rigidly by a chuck. The hydraulic pressure moving the wheel down can be preset and in each case was set to 90 pounds per square inch pressure. Measurement was made of the peak power used by the electric motor which drives the wheel. This measurement was made by a recording watt meter. Inasmuch as the cuts were made in one second of time or less, it was not feasible to evaluate the average amount of power required. So therefore the figures given are in terms of peak power in kilowatts. Each wheel was used to make at least forty cuts through the rod except that when the wheel stalled no further cuts were made. Although the machine was set to give 90 pounds pressure it must be understood that the pressure necessarily varied as the wheel moved through the workpiece due to the characteristics of hydraulic feeding mechanism. In each series of tests represented by the following Tables I, II and III, one or more naked wheels were used for the purpose of comparison. These as well as the wheels having a coating of plain paper and the wheels having the coating of paper with tin were factory made wheels and as shown in Tables I and II were not exactly alike but were as near alike as can usually be obtained. The naked wheels of Table II are substantially the same as the naked wheel of Table III and the difference in peak power is readily explained by the condition of the machine, the temperature of the oil and other unavoidable varying factors from day to day but the tests of Table I were carried out at the same time under the same conditions, the tests of Table II were carried out at the same time and under the same conditions, and the tests of Table III were carried out at the same time and under the same conditions wherefor each table is valid for the comparison between items thereon but items of one table should not be compared with items of another table. In this connection peak power indications are very sensitive which explains the general discrepancy between Tables II and III but the fact that repeated tests consistently showed the metal coated paper covered wheels to cut more freely is a valid indication that they do cut more freely, other conditions being equal, and it should be borne in mind that these metal coated paper coated wheels were each used to make at least 40 cuts, Table I has no column for peak power because Table I represents the first experiments in which a general evaluation of the invention was made.

In the tables the wheels having no paper at all are identified by the words "Naked Wheel" in the column headed "Wheel," the wheels having paper without any tin or other substance on the sides thereof are identified by the words "Plain Paper" in the same column, and the wheels having paper on the sides coated with tin are identified as "Paper and .008 gm./cm² Tin" and "Paper and .0125 gm./cm² Tin" respectively and the foregoing designations give the amount of tin in grams per square centimeter. In Table I under "Burn," the designations are self-explanatory, but it may be remarked that a blue burn is worse than a brown burn.

Table I

| Wheel | Wheel Wear on Diameter in Inches per Cut | Burn |
| --- | --- | --- |
| Paper and .008 gm./cm.² Tin | .0085 | None. |
| Naked Wheel | .11 | 50% Blue. |
| Do | .014 | 20% Brown. |

Table II

| Wheel | Wheel Wear on Diameter in Inches per cut | Average Peak Power in Kilowatts | Remarks |
| --- | --- | --- | --- |
| Naked Wheel | No measurement. | 32.0 | Stalled 7th Cut. |
| Do | do | 32.8 | Do. |
| Plain Paper | .010 | 31.5 | Stalled 9th Cut. |
| Do | .010 | 32.5 | Stalled 8th Cut. |
| Paper and .008 gm./cm.² Tin. | .0094 | 27.4 | Did not stall. |
| Paper and .0125 gm./cm.² Tin. | .010 | 23.0 | Free cutting. |

Table III

| Wheel | Wheel Wear on Diameter in Inches per Cut | Average Peak Power in Kilowatts | Remarks |
| --- | --- | --- | --- |
| Naked Wheel | .0088 | 19.9 | Stalled on Cuts 36–40 inclusive. |
| Plain Paper | .0094 | 19.9 | Stalled on Cuts 13, 15 and 17. |
| Paper and .008 gm./cm.² Tin | .0045 | 13.9 | Free cutting. |

I believe the action of the tin is to reduce the friction between the sides of the work piece and the wheel. This is a very important thing to do because all manufacturers are interested in reducing the time required for cutting-off operations as much as possible and the way to do this is to speed up the wheels and increase the pressure, but of course each of these requires more power and in every case it is found that so much pressure can be used and no more, otherwise the motor will stall, but by lubricating the cut in accordance with this invention greater pressure and/or higher speed can be used without stalling any particular motor. Of course if more and more power is supplied to match increase of speed and pressure finally the wheel will break, but this eventuality too will be postponed by the use of tin coated side face wheels.

Tin is soft and has a low melting point. Other metals of characteristics similar to tin which can be used in this invention are antimony, bismuth, cadmium, gallium, indium, lead, thallium. The following table gives the melting points and the positions in the periodic table of these metals.

Table IV

| Metal | Symbol | Group | Atomic Number | Melting Point, Degrees Centigrade |
| --- | --- | --- | --- | --- |
| Antimony | Sb | 5 | 51 | 630 |
| Bismuth | Bi | 5 | 83 | 271 |
| Cadmium | Cd | 2 | 48 | 321 |
| Gallium | Ga | 3 | 31 | 30 |
| Indium | In | 3 | 49 | 155 |
| Lead | Pb | 4 | 82 | 328 |
| Thallium | Tl | 3 | 81 | 304 |
| Tin | Sn | 4 | 50 | 232 |

Various alloys of the foregoing metals are known and any alloy of two or more of the metals in the above list can be used, for example one eutectic fusible alloy having a melting point of 96° C. is 53 Bi, 32 Pb, 15 Sn. Another eutectic fusible alloy is 52 Bi, 40 Pb, 8 Cd having a melting point of 91.5° C. Rose metal is 50 Bi, 27 Pb, 23 Sn. Lipowitz alloy having a melting point of about 70° C. is 50 Bi, 27 Pb, 13 Sn, 10 Cd. Wood's metal having a melting point of 65.5° C. is 50 Bi, 25 Pb, 12.5 Sn, 12.5 Cd. Bizmuth solder having a melting point of 111° C. is 40 Bi, 40 Pb, 20 Sn. Another eutectic fusible alloy having a melting point of 103° C. is 54 Bi, 26 Sn, 20 Cd. Battery plate metal which melts at 300° C. is 94 Pb, 6 Sb. Antimonial lead which melts between 245° C. and 290° C. ranges from 92 to 94 Pb and 6 to 8 Sb. Magnolia metal which melts at about 270° C. is 90 Pb, 10 Sb or 85 Pb, 15 Sb. Type metal is 82 Pb, 15 Sb, 3 Sn. Aluminum solder melting at 310° C. is 92 Pb, 8 Cd. Marine babbit is 72 Pb, 21 Sn, 7 Sb. Plumber's solder melting at 275° C. is 67 Pb, 33 Sn. Another type metal ranges from 56 to 60 Pb, 10 to 40 Sn and 4.5 to 30 Sb. Solder half and half melting at 225° C. is 50 Pb, 50 Sn. Brittania metal melting at 25° C. is 90 Sn, 10 Sb. An alloy of tin and antimony is 80 Sn, 20 Sb melting at 320° C. An alloy of tin and cadmium is 68 Sn, 32 Cd melting at 180° C. Tinman's solder melting at 240° C. is 67 Sn, 33 Pb. Tinsel is 60 Sn, 40 Pb. A eutectic fusible alloy melting at 145° C. is 50 Sn, 32 Pb, 18 Cd.

All of the above alloys can be used as all of them will melt during the grinding operation to lubricate the cut. Furthermore although the above examples do not give alloys of gallium, indium and thallium this is because those are rare or expensive metals but alloys thereof with each other and with other metals in the list can be made. In general some alloys of any two, three or four of the metals of table IV and probably of all of them can be made since the metal having the lowest boiling point is cadmium (778° C.) and this is higher than the melting point of the metal having the highest melting point to wit antimony. If an alloy of any two or more of the metals of table IV can be made, it can be used in this invention as any such alloy which can be made will have a melting point low enough for the purposes of this invention and most of them will have a melting point below that of antimony. However tin is preferred to the other metals or alloys having large proportions of the other metals because to some degree at least the others are poisonous although to such a slight extent that they nevertheless can be used.

A coating of metal can be applied to the sides of the wheel in any desired manner, the manner described being merely illustrative. For example a Schoop type of spray gun to spray metal can be used, and such metal spray guns are readily available on the market. For disclosure of such a spray gun see U. S. Patent to E. Morf No. 1,100,602.

I believe this coating will be effective to some extent if it has a density of at least .004 gram per square centimeter. Such a coating, if uniform, which it does not have to be, would be .00055 centimeter thick or approximately .00022 inch thick. This calculation is based on tetragonal tin having a specific gravity of 7.3 and the tin which I used was tetragonal tin.

Much thicker coatings can be used, however, provided the metal is granular. However too thick a coating would be detrimental because of the non-abrasive action of the metal and I believe that good results can be obtained with coatings up to .010 inch thick but not thicker.

Naturally most cutting-off wheels are not used in the cut right down to the central hole so in most cases it will be sufficient if the outer half of the area of the sides of the wheel is coated to the extent indicated. I mean that an area bounded by concentric circle the outer one of which is the periphery of the wheel, said area being equal to one-half the total area of the wheel including the central hole should be coated and that is enough. The radial length of such an area, where the radius of the wheel is $r$, is $.3r$. Thus in many cases it will be sufficient if the wheel sides are coated with metal from the periphery to three-tenths of the distance to the center although in other cases it will be desirable to coat the sides half way or more than half way from the periphery to the center.

The sides of cutting-off wheels are flat, that is they are either planes or approximate planes. They may be dished inwardly towards the center of the wheel by a few thousandths of an inch.

Further with regard to how much coating is required to achieve the purposes of this invention to a significant degree, there can be bare spots (uncoated places) on the wheel sides because the lubrication persists long enough to make bare spots immaterial provided the average density of the coating at any distance more than $.7r$ from the center, where $r$ is the radius of the wheel, is .004 gram per square centimeter. This is the same as 0.000056892 pound per square inch.

It will thus be seen that there has been provided by this invention grinding wheels in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

1. A cutting-off grinding wheel comprising abrasive granules bonded together with phenolic resin bond and having a grinding periphery and flat parallel sides and a coating of metal on each side thereof said metal being selected from the group consisting of antimony, bismuth, cadmium, gallium, indium, lead, thallium and tin and alloys thereof, said coating of metal on each side of the wheel being granular and having such an average thickness that it weighs at least .004 gram per square centimeter at any given distance from the center of the wheel greater than $.7r$ where $r$ is the radius of the wheel, and said coating of metal on each side of the wheel being nowhere greater than .010 inch thick.

2. A cutting-off grinding wheel as claimed in claim 1 in which the metal coating on each side of the wheel is tin.

3. A cutting-off grinding wheel as claimed in claim 1 in which the metal coating on each side of the wheel is an alloy of tin with other metal selected from the group of claim 1.

4. Method of cutting metals which consists in feeding a rotating grinding wheel that comprises abrasive grains bonded together with phenolic resin bond and which has flat parallel sides against the metal in a direction perpendicular to its axis while lubricating the cut by means of metal selected from the group consisting of antimony, bismuth, cadmium, gallium, indium, lead, thallium and tin and alloys thereof.

5. Method according to claim 4 in which the lubricating metal is tin.

6. Method according to claim 4 in which the lubricating metal is an alloy of tin with other metals selected from the group of claim 4.

References Cited in the file of this patent

UNITED STATES PATENTS

| 341,867 | Andrews | May 18, 1886 |
| 642,828 | Spohn | Feb. 6, 1900 |
| 2,038,727 | Geyer | Apr. 28, 1936 |
| 2,413,729 | Rushmer | Jan. 7, 1947 |
| 2,520,763 | Goeppert et al. | Aug. 29, 1950 |

FOREIGN PATENTS

| 417,085 | Great Britain | Sept. 27, 1934 |
| 441,406 | Great Britain | Jan. 20, 1936 |
| 622,673 | Great Britain | May 5, 1949 |